United States Patent [19] [11] 4,444,273
Ruby [45] Apr. 24, 1984

[54] TORQUE CONTROL SYSTEM FOR CATHEADS

[76] Inventor: Glenn E. Ruby, 2201 Hayes Rd., Apt. 3905, Houston, Tex. 77077

[21] Appl. No.: 239,984

[22] Filed: Mar. 3, 1981

[51] Int. Cl.[3] ........................ B23Q 5/027; E21B 19/16
[52] U.S. Cl. .................................. 173/12; 73/862.23; 73/862.25; 81/467; 173/164
[58] Field of Search ......................... 173/12, 163, 164; 81/467, 469, 470, 57.16, 57.22, 57.34, 57.35, 57.36; 73/862.21, 862.22, 862.23, 862.25; 91/59; 166/77.5, 85; 254/294

[56] References Cited

U.S. PATENT DOCUMENTS

| | | | |
|---|---|---|---|
| 3,606,664 | 9/1971 | Weiner | 73/862.23 X |
| 3,722,331 | 3/1973 | Rodulescu | 81/467 |
| 4,176,436 | 12/1979 | McCombs et al. | 173/12 X |
| 4,199,032 | 4/1980 | Weiner et al. | 173/12 |
| 4,244,434 | 1/1981 | Wilson | 81/467 X |
| 4,305,472 | 12/1981 | Brossette | 173/12 |

*Primary Examiner*—Frederick R. Schmidt
*Assistant Examiner*—Robert P. Olszewski
*Attorney, Agent, or Firm*—Neal J. Mosely

[57] ABSTRACT

A novel system controls accurately the torque applied to threaded connections by a cathead operating on a tong arm, usually a manual tong. A strain gage/transducer in the catline measures the pull on the tong arm and applies a signal to an electric meter having an adjustable switch/indicator for setting tong arm length to convert the signal to a reading of ft. lb. torque on the meter. a continuous strip chart records the torque and a recall circuit permits recall of the peak torque recorded on the meter after shut down. A thumb screw switch/indicator sets the selected maximum torque and a comparator trips the circuit when the torque exceeds the setting. The trip circuit energizes a solenoid on a three-way valve controlling the supply of air to an air clutch for the cathead. On actuation, the valve moves from a position directing air pressure to the clutch to a position dumping the air pressure from the clutch to stop tensioning of the catline by the cathead. A visual and audible alarm operates if the air pressure from the air clutch has not dropped to zero shortly after the solenoid circuit is energized. Pressure responsive safety means prevents the system from being restarted without first turning off the main air pressure control valve. A selector switch provides for switching the control apparatus between the make up cathead and the break out cathead.

21 Claims, 2 Drawing Figures

TORQUE CONTROL SYSTEM FOR CATHEADS

BACKGROUND OF THE INVENTION

1. Field of the Invention

This invention relates to new and useful control system and apparatus for catheads for controlling accurately the amount of torque applied to a threaded connection.

2. Brief Description of the Prior Art

There has been a long need for a control system for controlling accurately and rapidly the amount of torque applied to threaded connections by catheads in oil field operation.

Weiner et al. U.S. Pat. No. 4,199,032 discloses an apparatus for controlling the make up of a threaded connection which insures that a specified torque will not be exceeded. The apparatus consists of power tongs which pull against a fixed support and includes a comparator for comparing measured torque with a desired torque value and disengages make up of the connection when the measured torque exceeds the selected value.

McCombs et al. U.S. Pat. No. 4,208,775 discloses a method and apparatus for making threaded connections where the applied torque is monitored and when a reference torque is exceeded the number of turns is counted. The subsequent operation limits the number of turns of tightening the threaded connection to a predetermined percentage of the turns which would exceed the reference torque.

Rice U.S. Pat. No. 4,016,938 discloses a system for use with torque producing power tools which determines when a fastener has been driven to its yield point in tension and thereafter backing the fastener out sufficiently to establish a level of tension below the yield point.

Hannson U.S. Pat. No. 3,957,248 discloses a control for an air hoist operated by a pneumatic motor having a blow-off valve which vents at a predetermined load to limit the torque of the motor.

Conboy U.S. Pat. No. 3,933,388 discloses a fluid-operated, load-handling apparatus having an interlock control system including pressure sensitive valves which limit the operation of a pneumatic motor.

O'Leary U.S. Pat. No. 2,805,042 discloses a torque-limiting hoisting drum.

Fuelster et al. U.S. Pat. No. 3,497,787 discloses an automatic control for a mine hoist which accurately controls the position by control of an electric motor.

Himmelstein et al. U.S. Pat. No. Re. 28,899 (of U.S. Pat. No. 3,827,506) discloses a torque control for pneumatically operated nut drivers.

Hardiman et al. U.S. Pat. No. 3,939,920 discloses a tightening method and system for power wrenches which limits the application of torque to a predetermined percentage of a torque which would reach the yield point of the fastener being applied.

Bromell U.S. Pat. No. 3,662,842 discloses an automatic coupling system in which a sensing quill is used to operate a switch limiting the torque applied by the system and apparatus.

SUMMARY OF THE INVENTION

It is one object of this invention to provide a new and improved control system for catheads for controlling accurately the amount of torque applied by a cathead-operated tong to a threaded connection.

Another object of this invention is to provide an improved control system and associated apparatus for applying a predetermined torque to a threaded connection by means of a cathead operating on a tong and inactivating the cathead when the torque applied reaches or exceeds a selected level.

Another object of this invention is to provide a new and improved control system and apparatus for controlling the amount of torque applied to a threaded connection by a cathead operating on a tong in which the torque applied is continuously monitored and recorded and the peak torque may be recalled and registered on an indicating meter.

Another object of this invention is to provide a new and improved control system and apparatus for controlling application of torque by a cathead to a threaded connection through a tong in which the torque generated is compared with a selected maximum torque setting and, when the setting is equalled or exceeded, shutting off the air pressure to an air clutch for the cathead.

Still another object of this invention is to provide a new and improved control system and apparatus for controlling the amount of torque applied by a cathead and including safety alarm features indicating when the cathead has not been stopped within a very short selected time after exceeding the selected torque setting.

Still another object of this invention is to provide an improved control system for catheads including means preventing restart of a cathead after shut down until the compressed air has been shut off.

Other objects of this invention will become apparent from time to time throughout the specification and claims as hereinafter related.

These and other objects of the invention are achieved by a system and apparatus which are provided for controlling accurately the amount of torque applied to threaded connections by a cathead operating through a catline on a tong arm, usually a manual tong. A strain gage/transducer is interposed in the catline leading to the tong arm and measures the pull on the tong arm in lb. pull. The electric signal from the transducer is applied to an electric meter which is provided with an adjustable switch/indicator for setting tong arm length where the signal is converted to a reading of ft. lb. torque on the meter. The system includes a continuous recorder strip chart for recording the torque applied by the apparatus and a recall circuit permitting the recall of the peak torque recorded to be displayed on the meter after the system has shut down. The electric signal from the meter drive is fed to a thumb screw switch/indicator on which the desired or selected maximum torque is entered and a comparator which causes the circuit to trip when the torque signal equals or exceeds the selected maximum torque setting. When the torque trip circuit is actuated, a solenoid is energized on a three-way valve controlling the supply of compressed air to an air clutch controlling operation of the cathead. In the normal position, three-way valve allows application of compressed air to the air clutch. When the three-way valve is actuated by the torque trip circuit, the valve moves to a position dumping the air pressure from the air clutch and causing the cathead to stop further tensioning of the catline and further application of torque to the threaded connection. The system includes safety features in the form of pressure transducers in the three-way valve which provide a visual and audible alarm if the air pressure from the air clutch has not dropped to zero within a very short predetermined time after the circuit for operating the three-way valve is energized, and for responding to pressure in the three-way valve after a system shut down to prevent the system from being restarted wihtout first turning off the main air pressure control valve. This system also includes various on/off control switches, zero button and associated switch for resetting the meter at recall circuits to zero, reset switch for the torque control circuit, and high/low switches for setting the equipment for operation on a high range or torque or a low range of torque. The apparatus is designed for use on both a make up and break out cathead and includes a selector switch for switching the control portion of the apparatus between the control valve for the make up cathead and the control valve for the break out cathead.

DESCRIPTION OF THE PREFERRED EMBODIMENT

Figure 1:
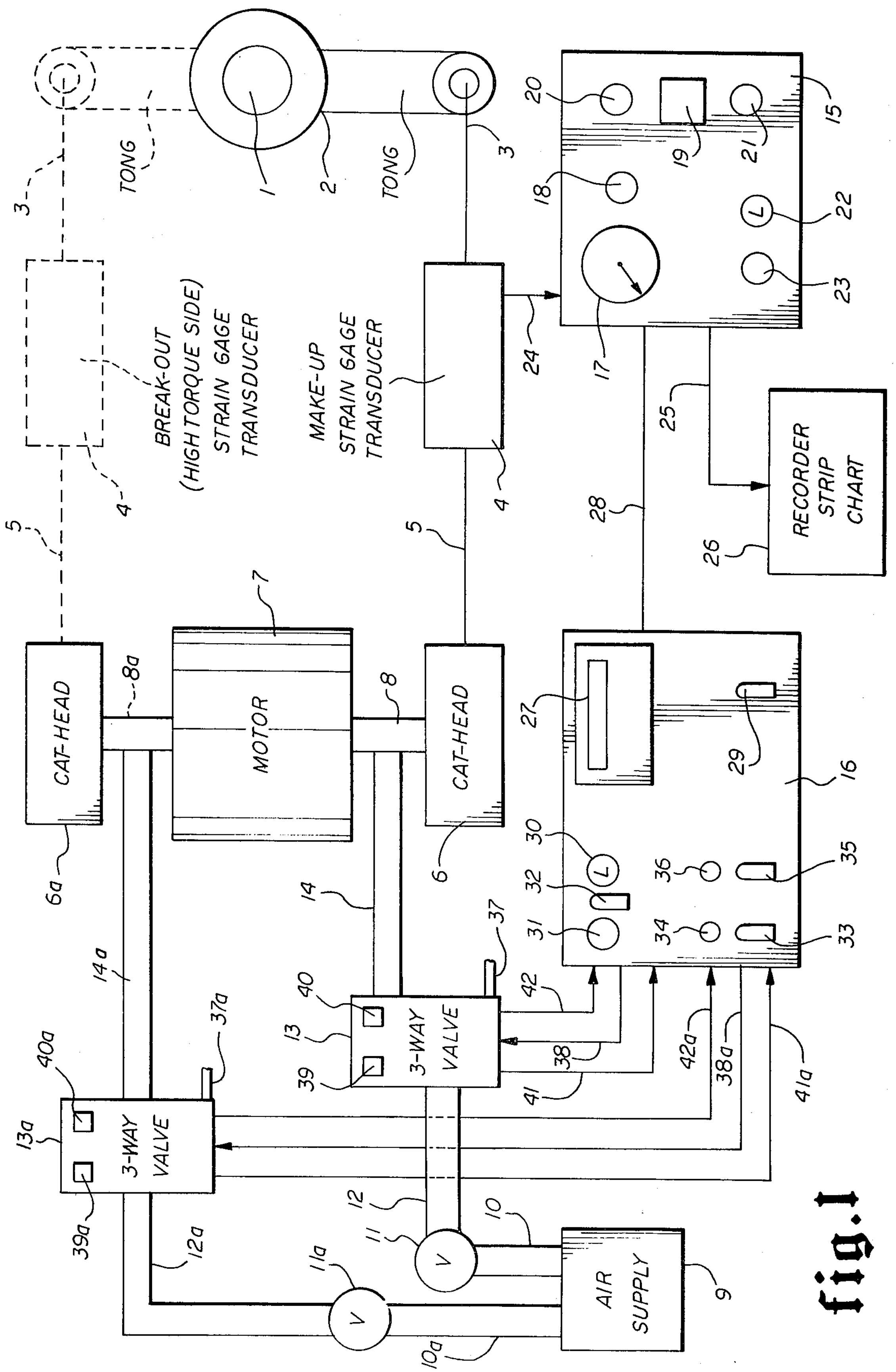
FIG. 1 is a schematic view of a cathead arranged for operation of tongs for making or breaking threaded joints in a drill string and a control system associated therewith.

This invention comprises a new and improved control system for catheads for controlling accurately the amount of torque applied to threaded connections in tool joints, drill collars, drill string, tubing and casing connections, etc. A cathead is a power driven rotating drum which winds and unwinds cable for use in the oil drilling industry. The cable which is operated by the cathead is used as a power source for many operations around the drilling rig, particularly make up and break out of threaded connections, usually by means of manual tongs. A problem in the drilling industry has been to control the amount of torque applied to threaded joints. In many cases, premature failure of threaded connections occurs as a result of the joints being made up too tightly. The control system illustrated in the drawings controls the amount of torque applied by a cathead in making up threaded connections.

Referring to the drawings by numerals of reference, and more particularly to FIG. 1, there is shown a box end of a drill pipe or collar or sub 1 which is threadedly connected to an adjacent pin end of the drill string, or other like threaded connection, and is to be tightened to a controlled or predetermined torque by use of this control system. The drill pipe or collar 1 has the jaws of a manual tong 2 clamped thereon for tightening the joint. Tong 2 is connected at the outer end by means of a shackle 3 which is connected to one side of a load cell having a strain gage/transducer 4 which is connected to catline 5. Temperature compensated 350 ohm strain gages are used to monitor the torque instantaneously in connection make up. The strain gages are mounted so that the shear stress is cancelled and only axial strain or tension is present under load. Each load cell is completely sealed and is maintenance free.

The catline 5 is wound on cathead 6 (or 6*a*) which is driven by motor 7. The drive connection between motor 7 and cathead 6 (or 6*a*) consists of a compressed air operated clutch 8 (or 8*a*) which is controlled between an off and on position by the control system as will be subsequently described. Catheads have a separate make up cathead and break out cathead. While these catheads are sometimes the same size, the break out cathead is often much more powerful. This apparatus is used mainly on the make up cathead but may be used on the break out cathead where more power is required. In this apparatus, the cathead 6 is for make up and cathead 6*a* is for break out. Clutch 8 controls make up cathead 6 and clutch 8*a* controls break out cathead 6*a*.

The system is provided with compressed air from an air supply source 9 which is connected by air line 10 to one side of a manually operated control valve 11. The other side of control valve 11 is connected by air line 12 to a three-way control valve 13, the other side of which is connected by air line 14 to compressed air operated clutch 8 for make up cathead 6.

Similarly, compressed air from air supply source 9 is connected by air line 10*a* to one side of a manually operated control valve 11*a*. Control valves 11 and 11*a* are provided for manual selection of the application of air pressure to clutch 8 or clutch 8*a*. The other side of control valve 11*a* is connected by air line 12*a* to a three-way control valve 13*a*, the other side of which is connected by air line 14*a* to compressed air operated clutch 8*a* for break out cathead 6*a*.

The apparatus is controlled by a system which is mostly enclosed in control boxes 15 and 16. Control box 15 includes an indicating meter 17 which is calibrated to read in units of torque, i.e. ft. lbs., applied to the threaded joint. Control box 15 is designed for operation on two different scales of torque, viz. a low scale and a high scale as indicated on meter 17. Switch 18 is provided to selected whether meter 17 is to read on low scale or high cable. Meter 17 is designed so that vibration and temperature change have a minimum effect on needle movement. The needle will follow the torque quickly and accurately during thread make up. The control box 15 is provided with adjustable switch and indicator 19, e.g. a thumb wheel switch with indicating scale, for entering the length of the tong arm 2, e.g. from 1 to 99 inches. The entering of the length of the tong arm 2 is required to convert the strain in catline 5 in lbs. pull to units of ft. lb. at the indicator 17.

Control box 15 is provided with control button 20 actuating a recall switch (not shown) 59 for causing meter 17 to recall the peak voltage on the capacitor in the recall circuit 59 and display the same as the maximum torque reading. After removing the tong from the pipe, the operator has approximately one minute to recall maximum torque and maintain about 99% accuracy. A zero button 21 is provided for actuating a reset switch for resetting meter 17 to electrical zero and resetting the maximum torque circuit to zero. An indicator lamp 22 is provided as a visual signal when conditions of low voltage are encountered. An off/on switch 23 is provided for turning control box 15 off and on. Control box 15 is connected by electric lead 24 to strain gage/transducer 4. The signal from strain gage/transducer 4 is transmitted through connection 24 to meter 17 where the signal is converted from units of lbs. pull to units of ft.lb., depending upon the setting of the tong arm length switch 19. The signal from meter 17 is indicated in units of ft.lb. on the gage face thereof and is also transmitted by electric lead 25 to a continuous strip chart recorder 26 which produces a continuous record of the varying torque applied to the joint by cathead 6.

Control box 16 is provided with indicator 27 which is shown schematically and is settable by a thumb wheel switch to the selected maximum permissible torque.

Included in indicator 27 is a control gate (not shown) which trips when the torque signal from meter 17 through electric lead 28 is equal to or greater than the maximum torque setting entered thereon. The tripping of the control gate is effective to actuate three-way valve 13 (or 13*a*) to shut off the air flow to compressed air operated clutch 8 (or 8*a*) and stop further make up of cathead 6 (or 6*a*). Control box 16 is provided with a high-low control switch 29 for setting indicator 27 to the high scale or the low scale depending upon the scale setting of torque meter 17.

Control box 16 has a signal light 30 and audible alarm 31 (horn, buzzer or the like) for signaling when the fail-safe circuit has been operated. Control switch 32 is connected to turn the audible alarm circuit off or on. An on/off switch 33 controls energization of the torque control trip circuit. A signal lamp 34 is provided which indicates that the torque trip circuit is energized. Selector switch 35 connects the apparatus for controlling valve 13 which controls the make up cathead 6 or valve 13*a* which controls the break out cathead 6*a*. Switch 36 is a system reset switch for restarting the system after a power interruption.

Control valve 13 (or 13*a*) is provided with a bypass outlet opening 37 (or 37*a*) for dumping air pressure to atmosphere during shut down of the apparatus. Valve 13 (or 13*a*) is a three-way solenoid-operated valve. In the normal or initial, position the valve connects air lines 12 (or 12*a*) and 14 (or 14*a*) and closes air line 37 (or 37*a*) so that compressed air is applied to clutch 8 (or 8*a*) for allowing motor 7 to operate cathead 6 (or 6*a*). Electric lead 38 (or 38*a*) extends to the solenoid (not shown) of three-way valve 13 (or 13*a*) and is operated to energize the solenoid when the apparatus exceeds the preset torque and thus causing the valve to move to a position shutting off the supply of compressed air to clutch 8 (or 8*a*) and allowing the compressed air in clutch 8 (or 8*a*) to vent through lines 14 (or 14*a*) and 37 (or 37*a*).

Three-way valve 13 (or 13*a*) is provided with a pair of pressure sensing transducers 39 (or 39*a*) and 40 (or 40*a*). Transducer 39 (or 39*a*) responds to air pressure in line 12 (or 12*a*) and transmits a signal through electric lead 41 (or 41*a*) to control box 16 to valve drive amplifier 54 which prevents the system form being restarted after shut down without first closing valve 11 (or 11*a*) to shut off the clutch-operating air pressure. This is necessary for the safety of the operation or other workers on the rig. Transducer 40 (or 40*a*) is responsive to pressure in line 14 (or 14*a*) from compressed air operated clutch 8 (or 8*a*) and provides a signal through electric lead 42 (or 42*a*) to activate audio alarm 31 or signal lamp 30 if the air pressure at clutch 8 (or 8*a*) has not dropped to zero within about 0.120 second after the circuit controlling three-way valve 13 (or 13*a*) has been energized for actuating the valve to the position for exhausting air from the air clutch 8 (or 8*a*). Signal lamp 30 is a flashing lamp which flashes at a frequency, e.g. about 5–6 c.p.s., which is uncomfortable to look at and therefore quickly noticed.

Figure 2:
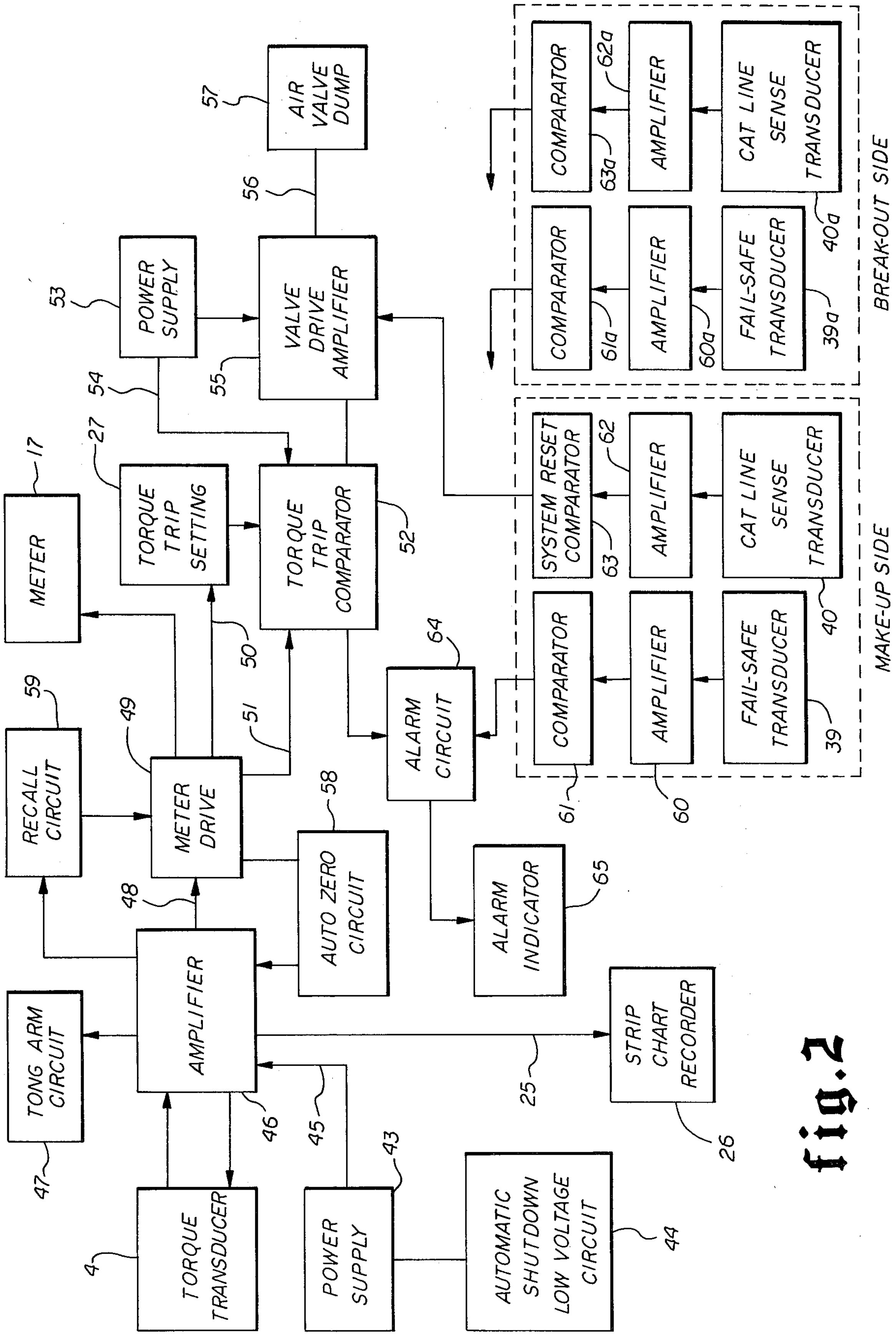
FIG. 2 is a schematic view of the control components of the control apparatus used in the system shown in FIG. 1.

In FIG. 2, the various electrical components of the system are shown schematically. As previously noted, the system is arranged for operation of a dual cathead having a motor driven make up cathead 6 and break out cathead 6*a*. The system shown in FIG. 1 is shown connected for operation of make up cathead 6, with break out cathead 6*a* having its connections shown in dotted line. When the system is used for controlling break out cathead 6*a*, connections are run from transducer 4 in the position shown in dotted line to control box 15. Control switch 36 on control box 16 is operated to connect the control box to the valve 13 or 13*a* for the particular cathead 6 or 6*a* being controlled.

In FIG. 2, the circuit is provided with a first power supply 43 which is preferably an 18 volt battery pack. Power supply 43 is connected to automatic shut down low voltage circuit 44 which deenergizes the main circuit when the power supply drops to 15.3 volts and turns on a low voltage signal LED (not shown) which remains on until the power supply drops to 12.5 volts at which point the signal LED will turn off also. Power supply 43 is connected through electric leads 45 to amplifier 46 which is connected to torque transducer 4 and to tong arm circuit 47.

Amplifier 46 is also connected by electric lead 48 to meter drive 49 which controls meter 17. The output from meter drive 17 is an electric torque signal which is connected by electric lead 50 to the control gate in torque trip setting indicator 27. The torque signal is also connected through electric lead 51 to torque trip comparator 52. Torque trip comparator 52 is supplied with power from power supply 53 through electric lead 54. Power supply 53 and comparator 52 are both connected to valve drive amplifier 55 which is connected by lead 56 to solenoid 57 of three-way valve 13 (or 13*a*). Meter drive 49 is also connected to the audio zero circuit 58 which is connected to amplifier 46 and is utilized for resetting the meter to electrical zero. Amplifier 46 is also connected to recall or peak voltage holding circuit 59 which is controlled by switch 20 to energize meter drive 49 to cause meter 17 to indicate the maximum torque reading registered by the maximum torque circuit.

The three-way valve 13 (or 13*a*) controlling the cathead 6 (or 6*a*) has its sensing transducer 39 (or 39*a*) connected to amplifier 60 which in turn is connected to system reset comparator 61 and thence to valve drive amplifier 55. This circuit is effective to prevent energization of three-way valve 13 (or 13*a*) after shutdown without first operating valve 11 (or 11*a*) to turn off the air pressure. This is necessary to prevent premature or unexpected operation of the cathead which could be dangerous to operating personnel.

Fail-safe transducer 40 (or 40*a*) is connected to amplifier 61 and thence to comparator 63 and to torque trip comparator 52. Transducer 40 (or 40*a*) responds to the presence of air pressure in line 14 (or 14*a*) from clutch 8 (or 8*a*) to activate alarm circuit 64 and alarm indicators 65 which includes flashing signal lamp 30 and audible alarm 31. These signals are energized if the air pressure in line 14 (or 14*a*) from clutch 8 (or 8*a*) does not drop to zero within 0.120 second after energization of the contrl circuit for three-way valve 13 (or 13*a*) for actuating the same to the position releasing air pressure from the cathead clutch.

OPERATION

The operation of this apparatus should be fairly apparent from the description of the assembly and function of the apparatus components. Nevertheless, the operation will be described again in more detail to give a more thorough understanding of the invention.

The cathead equipment, consisting of motor 7 and make up cathead 6 and break out cathead 6*a* and the air clutches 8 and 8*a* therefor, are standard equipment around most drilling rigs. The air clutches 8 and 8*a* are supplied from a compressed air source 9 and are provided with control valves or selector valves 11 and 11a for directing the application of compressed air to clutch 8 or clutch 8a depending upon which cathead is being operated. In the use of equipment of this type for making up or breaking out threaded joints, a manual tong 2 is applied to one part of a threaded connection and is connected by a catline 5, e.g. cable or chain, which is wound on cathead 6 for application of tension. In the standard equipment presently used, the operator controls the force applied by the cathead through catline 5 to tong 2 by turning the air control valve 11 on or off for application of force by the cathead to tension the catline to the desired degree. This has been largely a matter of field judgment or "feel" as to how much force can be applied in making up a threaded connection. As a result, threaded connections are often over stressed and damaged by being made up to an excessive amount of torque. This apparatus is also used for breaking out threaded connections by installation of tong 2 in the reverse direction and connecting the same to catline 5 run off the break out cathead 6a. The careful control of application of torque is not necessary in breaking out a threaded connection as it is in making up a threaded connection. There have been some efforts made to control the amount of torque applied by a cathead to a tong in making up a threaded connection but none of these have provided the desired level of control and of safety.

In this apparatus, the control features consist of the three-way valves 13 and 13a connected in the air lines leading to clutches 8 and 8a for catheads 6 and 6a. Control boxes 15 and 16 are provided for controlling three-way valves 13 and 13a and providing certain safety and indicating features. Recorder strip chart 26 is also a feature of the control system. The use of the strain gage transducer 4 in association with control box 15 completes the control features of the apparatus.

When the equipment is assembled, as shown in FIG. 1, tong 2 is applied to the pin end of a threaded member 1 and the arm of tong 2 is connected by shackle 3 to strain gage/transducer 4 and to catline 5 leading to cathead 6 (or 6a).

If the equipment has been in operation, recall button 20 may be actuated to get a reading of the previous peak torque applied. Also, zero button 21 may be actuated to reset meter 17 to the electrical zero and reset the maximum torque circuit to zero. Switch 18 is operated to select the scale to be used on meter 17. Control box 15 is energized by turning control switch 23 on. Thumb wheel switch and indicator 19 is adjusted to enter the length of the arm of tong 2 so that the strain in catline 5 which is read by strain guage/transducer 4 will be converted from lbs. pull to ft. lb. on torque meter 17. Strip chart recorder 26 provides a continuous recording of the torque applied to the threaded connection.

Control box 16 is turned on by means of switch 33 which energizes the torque trip circuits. Reset switch 36 is operated if needed. Switch 29 is operated to select the high or low scale for the torque setting on indicator 27. The thumb wheel screw of indicator 27 is operated to enter the setting of the maximum torque to be permitted during operation of the equipment for making up the threaded connection. Selector switch 35 is operated to determine whether control box 16 is operatively controlling three-way valve 13 or three-way valve 13a, *l depending upon whether the make up cathead 6 or the break out cathead 6a* is to be used and controlled.

In normal operation, the motor 7 of the cathead assembly runs continuously. The cathead 6 (or 6a) is turned on or off by application of air pressure to air operated clutch 8 (or 8a) by selector valves 11 and 11a from the compressed air source 9. When the system is started up, three-way valve 13 (or 13a) is in its normal or initial position connecting air lines 12 (or 12a) and 14 (or 14a) to apply compressed air to the clutch for the cathead which is being operated. Three-way valve 13 (or 13a) is operated by a solenoid (not shown) which, when energized, moves the valve to a position connecting air line 14 (or 14a) with outlet 37 (or 37a). The actuation of three-way valve 13 (or 13a) by this control system results in the cut off of application of air pressure to the clutch for the cathead being used and simultaneously dumps the air pressure from the clutch to atmosphere.

As cathead 6 winds up catline 5 and pulls on the outer end of tong 2, the linear strain in catline 5 is measured by strain gage/transducer 4 which generates a voltage proportional to the tension which is applied to meter drive 49 in control box 15 and registers on meter 17 as ft. lb. of torque. The electric signal from transducer 4 is in the form of lb. pull and is converted to ft. lb. of torque by application of the setting of thumb wheel switch/indicator 19 where the tong arm length is entered. The torque signal registers continuously on meter 17 and also registers on recorder strip chart 26 to provide a continuous record of the torque applied to the threaded connection.

The torque signal is also applied to torque trip comparator 52 which is controlled by the torque trip setting on thumb wheel switch/indicator 27 which has been set for the desired maximum torque to be applied in making up the threaded connection. When the torque signal is equal to or greater than the setting on thumb wheel switch/indicator 27, torque trip comparator 52 applies an electric signal through valve drive amplifier 55 which opeates air valve dump 57 which is the solenoid for three-way valve 13 (or 13a). The energization of air valve dump or solenoid 57 causes three-way valve 13 (or 13a) to move to the position disconnecting air lines 12 (Or 12a) and 14 (or 14a) and connecting air line 14 (or 14a) to outlet 37 (or 37a). This stops the application of compressed air to clutch 8 (or 8a) and allows the air pressure from the clutch to dump through line 14 (or 14a) and outlet 37 (or 37a). If the system is operating normally, the actuation of three-way valve 13 (or 13a) is effective to stop the operation of the cathead 6 (or 6a) and prevent making up the threaded connection beyond the torque setting on the thumb wheel switch/indicator 27.

The pressure transducers 39 (or 39a) and 40 (or 40a) in three-way valve 13 (or 13a) provide additional features in safety in the system. Pressure transducer 40 (40a) responds to the pressure in air line 14 (or 14a) from the air operated clutch. If the pressure in air line 14 (or 14a) has not dropped to zero within 0.120 seconds after the circuit for operation of three-way valve 13 (or 13a) is energized, the alarm circuit 64 and alarm indicator 65 including flashing signal lamp 30 and audible alarm 31, is activated. This alerts the rig operator and other personnel to the fact that the air clutch has not turned the cathead off. On currents of this signal, the rig operator would shut down the cathead by manual operation of valve 11 and investigate why the automatic system had not operated. This fail safe operation occurs by action of fail safe transducer 40 working through amplifier 62 and comparator 63 providing a fail safe signal to alarm circuit 64 for actuation of alarm indicators 65.

Pressure transducer 39 (or 39*a*) is responsive to air pressure in the cat air lines 12 and 12*a*. When transducer 39 senses air pressure in the system, the signal from the transducer acting through amplifier 60 and system reset comparator 61 operating through a signal transmitted to valve drive amplifier 55 maintains the air valve dump 57 energized to prevent three-way valve 13 (or 13*a* ) from returning to its normal or initial position until air in line 12 or 12*a* has been vented. Thus, after trip shut down of the system, it can not be restarted without first turning off the manual air control valve 11 (or 11*a*) to reduce the pressure on transducer 39 (or 39*a*) to zero. This feature is provided so that the system can not be restarted prematurely after a shut down which might result in injury to operating personnel.

After the system has shut down, the operator can press the recall button 20 and obtain a read out on meter 17 of the peak torque which was produced during the previous sequence of operation up to the time the system shut down. This peak torque would, of course, also be recorded on the recorder strip chart 26. After a threaded connection has been made up as just described, the zero button 21 is pressed to reset the meter and recall circuits to electrical zero. The system is then ready for operation in making up or breaking out another threaded connection.

On using the system for making up another threaded connection, a new entry for the length of the arm of tong 2 will be entered on thumb screw switch and indicator 19, if needed, and the meter scale will be set to the required high or low range. Also, if needed, a new setting will be entered on indicator 27 for a maximum torque to be applied by the apparatus.

While this invention has been described fully and completely with special emphasis upon a single preferred embodiment, it should be understood that within the scope of the appended claims the invention may be practiced otherwise than as specifically described herein.

I claim:

1. A system for controlling make up torque in a threaded connection where the torque is applied by a catline from a cathead, having a pneumatic pressure operated clutch, to the arm of a tong secured to one member of the threaded connection, comprising means to sense the tension in said catline, means to convert the tension sensed by said tension sensing means to ft.lb. of torque, comparator means including means to set a selected maximum torque setting and operable to compare the torque sensed with the maximum torque setting, controllable valve means controlling the application of pneumatic pressure to said clutch, said comparator means being operable to actuate said valve means to a position cutting off the application of pneumatic pressure to said clutch in response to a sensed torque equal to or greater than said maximum torque setting, electric alarm means, and pressure sensing means operable to actuate said alarm means if the pneumatic pressure applied to said clutch is not cut off within a predetermined time after said sensed torque equals or exceeds said selected maximum torque setting.

2. A torque control system according to claim 1 in which said pressure sensing means comprises a pressure sensing transducer positioned in said valve means and timing means cooperable therewith to actuate said alarm means if the pneumatic pressure applied to said clutch is not cut off within a predetermined time after said sensed torque equals or exceeds said selected maximum torque setting.

3. A torque control system according to claim 2 in which said alarm means comprises an electric audible alarm.

4. A torque control system according to claim 2 in which said alarm means comprises an electric signal light.

5. A torque control system according to claim 1 including electric recording means for continuously recording the torque registered by said converting means.

6. A torque control system according to claim 5 in which said recording means comprises an electrically operated continuous strip recorder.

7. A torque control system according to claim 1 including electric indicator means responsive to said converting means to indicate continuously the torque sensed by said tension sensing means and registered by said converting means.

8. A torque control system according to claim 7 including electric circuit means operatively connected to said electric indicator means and operable to register thereon the maximum torque sensed and indicated during operation of said system.

9. A torque control system according to claim 7 in which said electric indicator means includes an electric circuit and switch means to set said circuit and indicator to zero after actuation of said valve means to cut off pneumatic pressure to said clutch.

10. A torque control system according to claim 7 in which said indicator means comprises a meter having two scales registering different ranges of torque, and switch means for setting said meter for the range of torque being measured and displayed.

11. A torque control system according to claim 1 including an electrically operated meter and electric circuit therefor continuously registering as torque the signal from said converting means, and said meter circuit including capacitor means operable to store the maximum electric signal registered as torque on said meter and a switch operable to discharge said capacitor means to cause an instantaneous maximum torque reading on said meter.

12. A system for controlling make up torque in a threaded connection where the torque is applied by a catline from a cathead, having a pneumatic pressure operated clutch, to the arm of a tong secured to one member of the threaded connection, comprising means to sense the tension in said catline, means to convert the tension sensed by said tension sensing means to ft.lb. of torque, comparator means including means to set a selected maximum torque setting and operable to compare the torque sensed with the maximum torque setting, controllable valve means controlling the application of pneumatic to said clutch, said comparator means being operable to actuate said valve means to a position cutting off the application of pneumatic pressure to said clutch in response to a sensed torque equal to or greater than said maximum torque setting, electric circuit means including and controlling said comparator means, and pressure sensing means operable in response to pneumatic pressure at the inlet to said valve means to inactivate said electric circuit means to prevent reactivation of said system after actuation of said valve means to cut off pneumatic pressure until pressure has been cut off to the inlet to said valve means.

13. A system for controlling make up torque in a threaded connection where the torque is applied by a catline from a cathead, having a pneumatic pressure operated clutch, to the arm of a tong secured to one member of the threaded connection, comprising electric signal means to sense the tension in said catline, electric means for converting a signal from said electric tension sensing means to an electric signal registered as ft.lb. of torque to convert the tension sensed by said tension sensing means to ft.lb. of torque and including means for entering the length of said tong arm for effecting the conversion of tension to torque, comparator means including means to set a selected maximum torque setting comprising electric means operable to compare a signal from said electric converting means with said selected maximum torque setting and to pass said signal when the sensed torque equals or exceeds said setting, controllable valve means comprising an electric solenoid valve actuated to cut off position in response to said signal passed by said comparator means and controlling the application of pneumatic pressure to said clutch, said comparator means being operable to actuate said valve means to a position cutting off the application of pneumatic pressure to said clutch in response to a sensed torque equal to or greater than said maximum torque setting, said solenoid valve comprises a three way valve having a first pair of openings connecting the source of air pressure to said air clutch and a second pair of openings connecting said air clutch to vent, said solenoid valve when inactivated connecting said first pair of openings and when activated connecting said second pair of openings, a first pressure sensing transducer positioned in said valve to respond to pressure in the connection from the source of compressed air, a second pressure sensing transducer positioned in said valve to respond to pressure in the connection from said air clutch, electric alarm means, said first pressure sensing transducer being electrically connected and operable in response to pneumatic pressure in the connection from the source of compressed air to inactivate said electric circuit means to prevent reactivation of said system after actuation of said solenoid valve to cut off pneumatic pressure until air pressure has been cut off to the inlet to said valve, electric circuit means including and controlling said comparator means, and said second pressure sensing transducer being connected to actuate said alarm means if the pneumatic pressure applied to said clutch is not cut off within a predetermined time after said sensed torque equals or exceeds said selected maximum torque setting.

14. A torque control system according to claim 13 in which said tension converting means includes means for entering the length of said tong arm for effecting the conversion of tension to torque, said electric indicator means includes an electric circuit and switch means to set said circuit and indicator to zero after actuation of said solenoid valve to cut off pneumatic pressure to said clutch, said indicator means comprises a meter having two scales registering different ranges of torque, switch means for setting said meter for the range of torque being measured and displayed, and said recording means comprises an electrically operated continuous strip recorder.

15. A torque control system according to claim 14 in which said alarm means comprises an electric audible alarm and a flashing electric signal light.

16. A system for controlling make up and breakout torque in a threaded connection where the torque is applied by a catline from a selected one of a pair of catheads, one of which is used for make up and the other used for breakout, each having a pneumatic pressure operated clutch, to the arm of a tong secured to one member of the threaded connection, comprising electric signal means comprising an electrical strain gage transducer to sense the tension in said catline, including means for entering the length of said tong arm for effecting the conversion of tension to torque, electric means to convert an electric signal from said electric tension sensing means to an electric signal registered as ft.lb. of torque and including meter means registering said converted signal as ft.lb. of torque, comparator means including means to set a selected maximum torque setting and operable to compare the torque sensed with the maximum torque setting, said comparator means comprises electric means operable to compare a signal from said electric converting means and said selected maximum torque setting and to pass said signal when the sensed torque equals or exceeds said setting, separate controllable valve means for each cathead, comprising an electrical solenoid operated valve actuated to cut off position in response to said signal passed by said comparator means, controlling the application of pneumatic pressure to the respective pneumatic clutches thereof, said comparator means being operable to actuate a selected one of said valve means to a position cutting off the application of pneumatic pressure to a selected clutch in response to a sensed torque equal to or greater than said maximum torque setting, switch means for selecting one of said valve means to be controlled by said comparator means, electric alarm means, and pressure sensing means operable to actuator said alarm means if the pneumatic pressure applied to said clutch is not cut off within a predetermined time after said sensed torque equals or exceeds said selected maximum torque setting.

17. A torque control system according to claim 16 in which said pressure sensing means comprises a pressure sensing transducer positioned in said valve means and timing means cooperable therewith to actuate said alarm means if the pneumatic pressure applied to said clutch is not cut off within a predetermined time after said sensed torque equals or exceeds said selected maximum torque setting.

18. A torque control system according to claim 17 in which said alarm means comprises an electric audible alarm.

19. A torque control system according to claim 17 in which said alarm means comprises an electric signal light.

20. A system for controlling make up torque in a threaded connection where the torque is applied by a catline from a selected one of a pair of catheads, each having a pneumatic pressure operated clutch, to the arm of a tong secured to one member of the threaded connection, comprising means to sense the tension in said catline, means to convert the tension sensed by said tension sensing means to ft.lb. of torque, comparator means including means to set a selected maximum torque setting and operable to compare the torque sensed with the maximum torque setting, separate controllable valve means for each cathead controlling the application of pneumatic pressure to the respective pneumatic clutches thereof, said comparator means being operable to actuate a selected one of said valve means to a position cutting off the application of pneumatic pressure to a selected clutch in response to a sensed torque equal to or greater than said maximum torque setting, and switch means for selecting one of said valve means to be controlled by said comparator means, electric circuit means including and controlling said comparator means, and pressure sensing means operable in response to pneumatic pressure at the inlet to said valve means to inactivate said electric circuit means to prevent reactivation of said system after actuation of said valve means to cut off pneumatic pressure until pressure has been cut off to the inlet to said valve means.

21. A system for controlling make up torque in a threaded connection where the torque is applied by a catline from a selected one of a pair of catheads, each having a pneumatic pressure operated clutch, to the arm of a tong secured to one member to the threaded connection, comprising electric signal means to sense the tension in said catline, means to convert the tension sensed by said tension sensing means to ft.lb. of torque and comprising electric means for converting a signal from said tension sensing means to an electric signal registered as ft.lb. of torque, comparator means including means to set a selected maximum torque setting and operable to compare the torque sensed with the maximum torque setting, said comparator means comprising electric means operable to compare a signal from said electric converting means with said selected maximum torque setting and to pass said signal when the sensed torque equals or exceeds said setting, separate controllable valve means for each cathead controlling the application of pneumatic pressure to the respective pneumatic clutches thereof, said valve means each comprising an electrically actuated valve actuated to cut off position in response to said signal passed by said comparator means, said comparator means being operable to actuate a selected one of said valve means to a position cutting off the application of pneumatic pressure to a selected clutch in response to a sensed torque equal to or greater than said maximum torque setting, an electric switch for selecting one of said valve means to be controlled by said comparator means, said valve comprises a three way solenoid valve having a first pair of openings connecting the source of air pressure to said air clutch and a second pair of openings connecting said air clutch to vent, said solenoid valve when inactivated connecting said first pair of openings and when activated connected said second pair of openings, a first pressure sensing transducer positioned in said valve to respond to pressure in the connection from the source of compressed air, a second pressure sensing transducer positioned in said valve to respond to pressure in the connection from said air clutch, electric alarm means, said first pressure sensing transducer being electrically connected and operable in response to pneumatic pressure in the connection from the source of compressed air to inactivate said electric circuit means to prevent reactivation of said system after actuation of said solenoid valve to cut off pneumatic pressure until air pressure has been cut off to the inlet to said valve, electric circuit means including and controlling said comparator means, and said second pressure sensing transducer being connected to actuate said alarm means if the pneumatic pressure applied to said clutch is not cut off within a predetermined time after said sensed torque equals or exceeds said selected maximum torque setting.

* * * * *